Aug. 7, 1962

M. O. MORRISON 3,048,212

HOSE COUPLING APPARATUS

Filed Nov. 2, 1959

*INVENTOR.*
MARKS O. MORRISON

BY *Clifford L. Mitchell*

HIS ATTORNEY

Aug. 7, 1962 M. O. MORRISON 3,048,212
HOSE COUPLING APPARATUS
Filed Nov. 2, 1959 2 Sheets-Sheet 2
FIG. 6
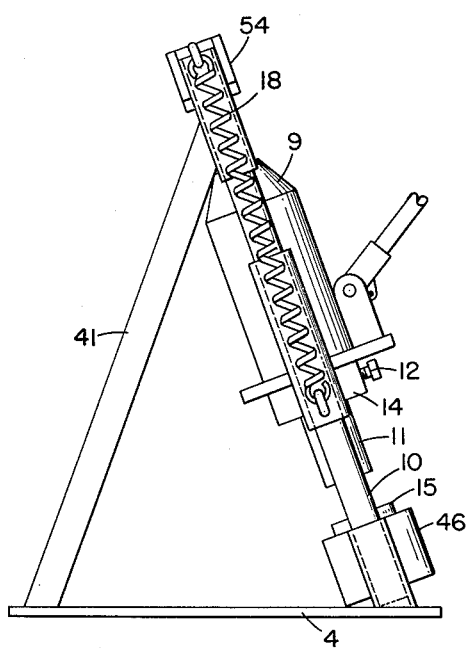
FIG. 7
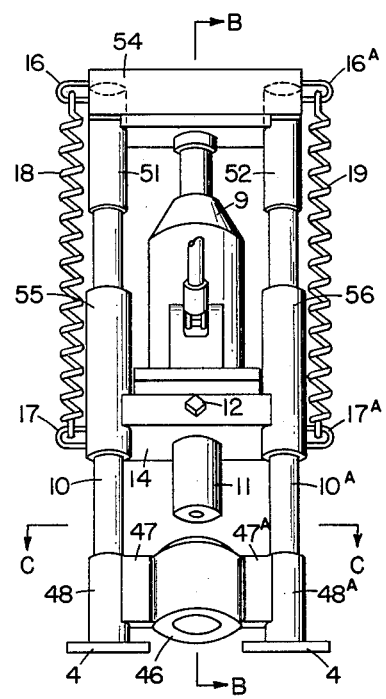
FIG. 8
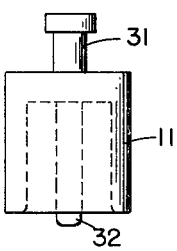
FIG. 9
FIG. 10
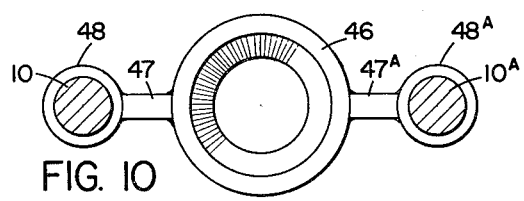
FIG. 11
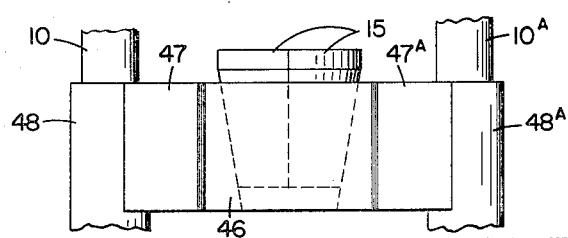
INVENTOR.
MARKS O. MORRISON
BY 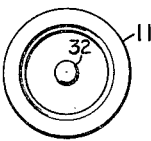
HIS ATTORNEY United States Patent Office 3,048,212
Patented Aug. 7, 1962

3,048,212
HOSE COUPLING APPARATUS
Marks O. Morrison, Lyman, Nebr.
Filed Nov. 2, 1959, Ser. No. 850,227
2 Claims. (Cl. 153—1)

This invention relates to a hose coupling apparatus and more particularly to a means for swedging hose couplings onto the outside of a hydraulic hose, more particularly described hereinafter.

Generally, in the past, various types of machines have been marketed which apply a particular coupling to hydraulic hose. The adaptability of these machines are limited to use with certain types of couplings, such as those which have threaded ferrules having replaceable features. Other machines merely crimp a band or a banded type ferrule onto the outer portion of the hydraulic hose, squeezing the hose against a spud type inner piece, so as to hold the hose tightly against the walls of said spud.

Virtually all of these machines require that the outside layer of rubber on a rubber hydraulic hose, for example, be shived off so that a better connection can be made. This shiving or laying back of the top layer of the rubber is a time consuming operation and tends to weaken the hydraulic hose at that point where the rubber has been removed. More particularly, as has been found in practice, the hose is extremely weakened at the base of the coupling so applied, so as to render it very susceptible to blow-out under normal hydraulic working pressures, at the principal point where it normally gets the most flexure and also at the point where strength is actually of the utmost necessity.

There have been hose couplings designed in the past which are swedged onto the outside of a hose without removing any of the outside layer of hose, however, there has been no coupling until recently which would withstand the high working pressures used in the industry, without blowing the coupling off. Several remedies have been provided in this regard, such as corrugating the spud, and providing holes in the ferrule itself, such as shown in the Letters Patent issued to J. W. Walsh et al. on October 22, 1957, United States Patent No. 2,810,594. The difficulty heretofore, however, has been in the apparatus for swedging on these couplings.

Hence what I have invented is a simple, economically constructed, ram type device for swedging on couplings regardless of whether the ferrule is a solid piece or has perforations for expansion of the rubber material, or some other type of coupling to be applied by the swedge-on method. This machine eliminates the necessity for additional equipment necessary to hold the hydraulic hose while the coupling is being installed, a process which weakens the wire reinforcing of the hydraulic hose at the point where the said hose is held, and further eliminates shiving off any outside layer of rubber, while installing a coupling which, under laboratory tests, will withstand the hydraulic working pressure of 3000 pounds or more. Such working pressure is more than double the ordinary working pressure that will be used in the farm implement industry, to which this device has found considerable commercial success.

One principal object of this invention therefore is to provide a simple machine which can be hand operated without any additional external means of power, but which, when so operated, will produce an adequate vertical force to install a swedge-on type coupling to any type of hose, whether it be wire braid hose, rayon hose, rubber hose or other types, but not to include that hose which has a steel outside jacket, and by means thereof install a factory type coupling.

A further object of this invention is to provide an economical and simplified apparatus that may be used and operated by the individual farm owner and farm implement dealer for the manufacture and repair of hydraulic hose without the necessity of additional expensive hydraulic equipment for the installation of said hose couplings.

A further object of this machine is to provide an apparatus for use in the installation of hose couplings that effectively couples the hose within a time of one minute from the beginning of the operation, thereby eliminating the time required to install threaded couplings, which require a great deal of time to install, as well as excess equipment such as expensive mandrels for use in installing the spud element.

A further object of the invention is to provide a means for installing hose couplings by providing apparatus which does not crimp the hose below the coupling area, thus eliminating the weakening of the hose at the crimping point, and further providing a means which will swedge on the coupling in such a manner as to eliminate the blow-out tendencies immediately adjacent the base of the applied coupling after it has been installed.

Another object of this invention is to provide apparatus suitable for the repair of broken hose assemblies in the field without any additional equipment other than the simple device described herein.

Other features and characteristic objects of the invention will be apparent from the following description of the invention itself in connection with the drawings.

FIG. 6 is a side view of FIG. 7, and shows a modification of the species of the apparatus shown in FIG. 1;

FIG. 7 is a front view of the modified apparatus as compared with FIG. 2 of the drawings;

FIG. 8 is a view of the pusher assembly with an indication of how the locking screw holds the pusher inside the pusher housing assembly;

FIG. 9 is a bottom view of the pusher assembly shown in FIG. 8 showing the protruding stem of the pusher;

FIG. 10 is a partial view of the modification shown in FIG. 7 and along section C—C;

FIG. 11 is a front view of the structure shown in FIG. 10 indicating the split die halves inserted in the die bed as modified.

Figure 1:
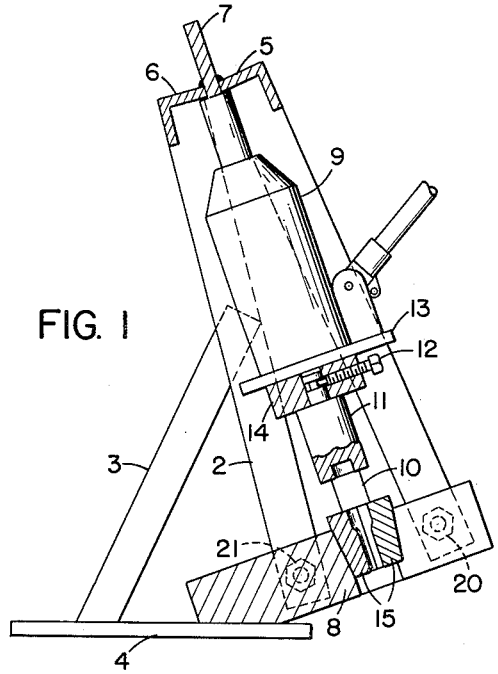
FIG. 1 is a side view of the apparatus taken along section A—A as shown in FIG. 2.
Figure 2:
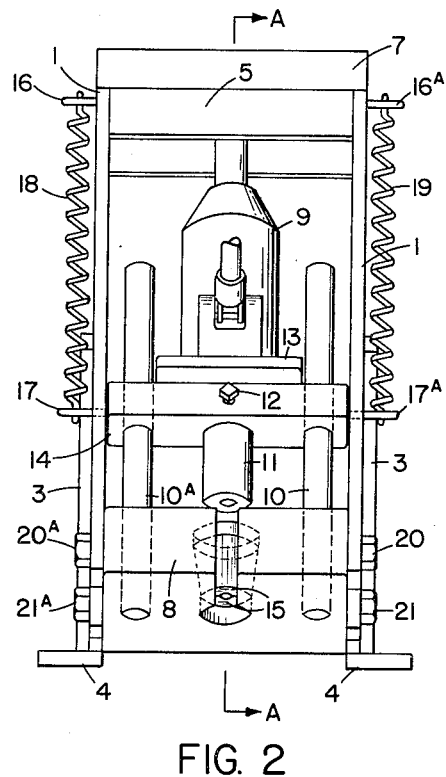
FIG. 2 is a front view of one species of the apparatus.

Referring now to the drawings and more particularly FIG. 2 thereof, the basic structure involves a frame means for supporting the other elements. Hence, strap iron members 1 and 2, which may also be angle iron or possibly wood of sufficient strength, have been bolted to the cast die piece 8 by means of bolts 20 and 20A and 21 and 21A, respectively. At the upper end of the members 1 and 2, there has been welded angle members 5 and 6, which are in turn joined by a single strap iron member 7 to form the initial support for the ram 9 as described more fully hereinafter. Bracing member 3 is also a strap iron member but may be angle iron or other suitable means, and such bracing member 3 has been welded or fastened to the strap iron member 2, of which there are symmetrical and identical members on each side of the structure. These members 3 are then welded to a base member 4, again having a symmetrical component not shown in the drawings in FIG. 1 but visible in FIG. 2 thereof. Members 4 form the base for the machine and may be welded to a table or bench, or bolted to such, as the case may be. Member 4 can be a solid plate, of a gusset nature, however, for economical reasons, I have chosen to use a strap iron member of sufficient width and thickness to permit bolting to a table without endangering the usual shearing stresses when punched or reamed for bolting. Another reason for using such type members of limited width instead of an entire gusset plate is for permitting permanent welds to be used along both sides of the members 4 to give additional strength in the event the machine is to be permanently fastened to a table by such means. The lower rear portion of the cast die bed 8 is welded to the sides of the base plates 4 to provide additional rigidity of the structure.

The angle bracing supports 5 and 6 form a housing recess for the upper portion of the ram member 9, which upper portion is welded to the angle members 5 and 6 and the interposing member 7. However, this is not a necessary weld since the entire frame structure is placed into a jig at the time of assembly and the ram member 9 is aligned to fit snugly into a true vertical axis position and then the support plate 13, which supports the ram member 9, is welded into position to the guide pin housing and pusher assembly housing block 14, said housing member 14 being held in its upper portion by means of the tensile strength of the resilient members 18 and 19, which are in turn connected to spring eye hooks 17 and 17, and 16A and 17A respectively. These spring eye hooks 16 and 16A are welded respectively to the frame members 1 and 2 at their upper portion and the spring eye hooks 17 and 17A are welded one in each end respectively of the housing block 14. It should be noted that the resilient member 18 and 19 are placed in position under a predesigned tension to cause the ram member 9 to be placed in compression at all times, thereby insuring its return to its original position once the complete installation of a hose coupling, in accordance with the operation described hereinafter, has been completed.

Holes are punched in the housing member 14 to permit the insertion of guide pins 10 and 10A and the housing member 14 slides vertically on the guide pins during the actuation of the ram. The lower ends of the guide pins 10 and 10A are securely fastened in the cast die bed 8, holes having been punched into said cast die bed for this purpose. When the ram member 9 is actuated, forcing the housing member 14 in a downward position, increased tension as described aforesaid, is placed on the resilient members 18 and 19. When the ram is released, resilient members 18 and 19 return the entire housing assembly 14 and the ram structure 9 to its original position, sliding along the guide pins 10 and 10A.

Figure 5:
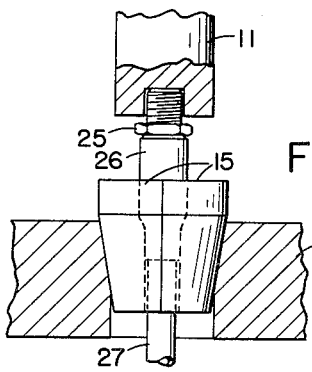
FIG. 5 is a view partly in section showing the die bed, the split die halves surrounding a length of hydraulic hose onto which a coupling has been affixed, along with the pusher assembly guide, which is inserted in the spud.

Turning our attention now to FIGS. 5, 8 and 9 and considering them in conjunction, FIG. 8 shows the pusher assembly, and FIG. 9 is a bottom view of said pusher assembly, identified by reference character 11. The pusher is a cylinder type structure having a hollow inner portion with a protruding metal stem 32, which is used to guide the coupling spud 25 in a manner more fully described hereinafter. The upper portion of the pusher assembly 11 has been machined to have a head 31 at its upper portion with a reduced neck portion on the member 31 so as to produce a slight flange area. The housing member 14 has been tapped in its middle portion to receive this head 31 as can be seen in FIG. 1 of the drawings. The housing assembly 14 has also been tapped on its front face to receive a screw or bolt 12 which is tightened into the tapped hole by hand, thus fastening the pusher 11 to the housing assembly 14 as particularly shown in FIG. 1 of the drawings, which indicates how the pusher is held to the housing assembly. It will be noted from FIG. 5 that as this pusher 11 is brought down upon the top of a coupling spud 25, when the ram is actuated in a downward position, that the pusher 11 surrounds the upper portion of the spud 25 with the protruding stem 32 entering inside the spud so as to guide the assembly properly as it is eventually swedged down through the split die halves 15. The pusher and the dies are machined for a particular size of coupling, for example, a half-inch one-wire braid hose requires a different set of split die halves and pusher assembly than does a three-eighths, three-quarter or one-inch fitting. The only difference in the split die halves is the circumference of the machined surface. The dies themselves are of the same outward size with the identical outward taper, so as to fit in the cast die bed regardless of what the inside fitting size may be.

Figure 3:
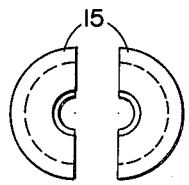
FIG. 3 is a top view of the split die halves used in connection with the apparatus.
Figure 4:
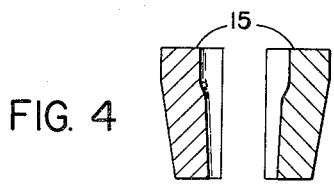
FIG. 4 is a sectional view of the split die halves as shown in FIG. 3, showing the taper of the interior of said die.

Turning to FIGS. 3 and 4 which show the split die halves as they are machined, it will be noticed that the die halves 15 have a beveled surface about one-third of the way down from their top portion. This permits the ferrule to expand upwardly as the entire unit is swedged down into the die itself. These dies have a very slight taper on their inner portion and as they are swedged down by the force of the ram 9, they squeeze the hose against the spud portion of the coupling and force the rubber, which is between the ferrule and the spud, up into the upper portion of the ferrule, thereby uniting the hose, spud and coupling. A good view of this is shown in FIG. 5 of the drawings, where the hose 27, ferrule 26, and spud 25 are shown in their relative positions just prior to being pushed through the lower portion of the dies. The purpose for having the dies in split halves is to permit removal of the assembly after the coupling has been made. You will note that the outer portion of the dies have a definite taper, this taper matching the taper of the cast die bed 8. It is imperative that this taper be within a certain range, otherwise the dies will stick in the die bed under the great force of the ram and will be impossible to remove without damage. I have found that the approximate degree of taper that is required is seventeen degrees.

Turning now to the modification of the general structure of the machine, as shown in FIGS. 6 and 7, it will be noticed that there are no strap iron supports 1 and 2 as shown in FIGS. 1 and 2 relative to the basic species. In lieu thereof, the guide pins 10 and 10A have been extended from the bottom of the machine to the top of the machine and now act as the entire support, while still permitting the ram assembly and housing to slide up and down, consequently permitting the machine to be supported on its own guide supports which have the dual function of guiding the vertical motion of the entire ram structure.

In order to facilitate this type of structure, you will note that in FIGS. 6 and 7 the cast die bed 8 has been eliminated and an alternative arrangement has been shown in which a piece of steel pipe has been used, the inner portion of which has been machined with the proper taper and bar stock steel has been welded to this pipe on oppposite sides and in addition, this bar stock steel has in turn been welded to the receiving post for the guide pins. More particularly, the steel pipe 46 has welded at opposite and symmetrical sides these pieces of bar stock steel 47 and 47A, which in turn are welded to the receiving posts 48 and 48A. The receiving posts 48 and 48A are fastened at the bottom to the strap iron members 4 which are identical to those used in describing the apparatus shown in FIGS. 1 and 2. At the upper portion of the modification shown in FIG. 7 are upper receiving posts 51 and 52, which have been welded to a solid steel block 54, the block 54 having been punched to enable the guide posts 10 and 10A to be lodged therein. In order to assure more rigidity, you will note that the housing member 14 no longer has the guide pins projecting through it, but instead cylindrical tubes have been symmetrically welded to each end of the housing 14, said tubes 55 and 56 being symmetrically arranged in such a position, and having hollow inner portions so as to permit the guide pins 10 and 10A to be inserted through the hollow portions thereof. There is actually no support given by these cylindrical tubes, as the diameter of the hollow portion is slightly larger than the outside diameter of the guide pins. This is necessary to permit the cylindrical tubes to slide in a vertical manner and direction as the ram is actuated downward and subsequently returned to its original position. The cylindrical tubes merely assure the guiding operation is in the manner desired.

Otherwise, the support for the ram structure and the operation as well as the pusher member die halves, and resilient members are all identical to that described in relation to the structures shown in FIGS. 1 and 2.

It will be noted that another feature of this invention requires that the entire structure have a definite tilt characteristic, which is peculiar to its operation. If the machine were vertical, it would not permit easy adaptation to the installation of the couplings to the average type of bench or table. With the tilt of the machine as shown, the entire apparatus may be mounted on any type of bench assembly and still permit ample working space in front of the bench to insert the hose and couplings. On the other hand, the tilt cannot be too much, otherwise it will make lowering of the ram by hand much more difficult, and by simple application of mechanics will not produce the vertical force required to swedge the coupling through the dies and produce the desired result.

Referring now to the actual operation and installation of a coupling as an illustrative example, but not limited thereto, an end of a hydraulic hose to which a coupling is to be applied is taken and a ferrule is placed over the end of the hydraulic hose and the coupling spud is pushed into the end of the hose by hand. The type of coupling most adaptable to this type of machine is a coupling similar to that shown in the Letters Patent issued to J. W. Walsh et al., Patent No. 2,810,594, issued October 22, 1957, since this spud is of small enough circumference to be placed into the hydraulic hose without any extra equipment such as mandrels for holding the hose and jacking the spud into the end thereof. Consequently, the operator pushes the spud entirely in against the ferrule base by hand and removes one of the split dies 15 and inserts the assembly into the die, replacing the split die half that was removed. As shown in FIG. 5, it will be noticed that this hose does not touch the sides of the split die halves and the entire coupling assembly at this point rests on the beveled edges of the inner portion of the die halves.

The pusher member is jacked down upon top of the upper ferrule base with the protruding tip 32 going inside of the spud itself. The force is applied from the pusher onto the upper ferrule base, which causes the ferrule to be swedged through the die halves as more and more ram pressure is applied.

This ram is operated downward until such a time as the lower portion of the pusher member 11 comes in contact with the top of the split die halves. At this point, you can no longer operate the ram downward and the operation is complete. By releasing the usual type of valve on the ram, the tension in the spring, or compression, will cause the entire assembly to return to its original position, after which time the split die half is again removed and the completed coupling assembly taken out. This entire operation requires less than one minute of elapsed time, while still providing a hydraulic hose coupling which has every characteristic, feature and dependability of a factory installed coupling.

It should be noted, however, that although a hydraulic ram or jack-type device is used to apply this pressure, it would be also adaptable to a screw type operation in which the pusher assembly is screwed down on a variable pitch ratio to provide enough force to swedge this ferrule through these die halves, so that I do not mean to limit the apparatus to the use with only a hydraulic ram, but have merely used that for purposes of illustration only.

Having thus described the machine and its component parts, along with the operation thereof, it will be understood that while in each of the illustrated embodiments of this invention, it should be understood that the above description is meant for purposes of describing and illustrating the invention in the best possible manner, but is not meant to limit its features in any way, as variations of the structure may be made within the scope of the claims.

What I claim is:
1. A hydraulic hose coupling apparatus comprising;
   I. A vertically inclined frame consisting of spaced parallel support members positioned between and connected to an upper housing and a base portion containing;
      A. A horizontally extending vertically slidable housing member positioned between and slidably mounted on said parallel support members,
      B. Said base portion having a downwardly tapered die receiving aperture therein,
   II. A vertically inclined reciprocal motor means affixed to said upper housing and, positioned parallel with respect to said parallel support members and having the reciprocal portion of said motor means affixed to said slidable connecting bar,
   III. A pusher assembly connected to the under side of said connecting bar and slidable therewith,
   IV. Removable sized split dies normally gravity retained in said aperture and having:
      A. An outer surface taper corresponding to the taper of said die receiving aperture and positioned in said aperture,
      B. An opening axially aligned with said pusher assembly defined by said assembled dies, presenting inner surfaces having an upper portion of greater circumference than the lower portion and having an inwardly beveled connecting portion between said upper and lower portions,
      C. Said opening sized to accommodate a flexible tube in the lower portion thereof and a spud and ferrule arrangement and extreme tube end in the upper portion thereof and,
      D. The inner surfaces of said dies forming swedging surfaces for compressing said spud and ferrule upon said tube end when sufficient pressure is applied axially by said motor means through said pusher assembly and,
   V. Said apparatus operable for various sized tubing and ferrules by reason of said removable sized dies being variable in axial opening cross section.
2. A hydraulic hose coupling assembler comprising;
   I. A vertically inclined frame consisting of;
      A. Spaced parallel support members positioned between and connected to an upper housing and a base portion,
      B. Said base portion having a tapered die receiving aperture therein,
      C. Said base portion inclined with respect to the horizontal plane so that said die receiving aperture is exposed in the upper and lower planes thereof for manipulating and positioning normally gravity retained loose dies in said aperture,
      D. A horizontally extending vertically slidable housing member positioned between and slidably mounted on said parallel support members,
   II. A vertically inclined reciprocal motor means affixed to said upper housing and, positioned parallel with respect to said parallel support members and having the reciprocal portion of said motor means affixed to said slidable connecting bar,
   III. A removable pusher assembly connected to the underside of said connecting bar and slidable therewith,

IV. Removable sized split dies normally gravity retained in said aperture and having:
   A. An outer surface taper corresponding to the taper of said die receiving aperture and positioned in said aperture and,
   B. An opening axially aligned with said pusher assembly defined by said assembled dies, presenting inner surfaces having an upper portion of greater circumference than the lower portion and having an inwardly beveled connecting portion between said upper and lower portions,
   C. Said opening sized to accommodate a flexible tube in the lower portion thereof and a spud and ferrule arrangement and extreme tube end in the upper portion thereof and,
   D. The inner surfaces of said dies forming swedging surfaces for compressing said spud and ferrule about said tube end when sufficient pressure is applied axially by said motor means through said pusher assembly and, V. Said apparatus operable for various sized tubing and ferrules by reason of said removable sized dies being variable in axial opening cross section.

References Cited in the file of this patent
UNITED STATES PATENTS

| | | |
|---|---|---|
| 409,994 | Matheson | Aug. 27, 1889 |
| 1,782,219 | Wallace | Nov. 18, 1930 |
| 2,031,824 | Eastman | Feb. 25, 1936 |
| 2,054,362 | Cowles | Sept. 15, 1936 |
| 2,060,860 | Flynt | Nov. 17, 1936 |
| 2,158,538 | Gish | May 16, 1939 |
| 2,324,501 | Geist | July 20, 1943 |
| 2,381,747 | Howe | Aug. 7, 1945 |